(12) United States Patent
Baentsch et al.

(10) Patent No.: US 6,272,504 B1
(45) Date of Patent: Aug. 7, 2001

(54) FLEXIBLY DELETING OBJECTS IN A RESOURCE CONSTRAINED ENVIRONMENT

(75) Inventors: Michael Baentsch, Langnau; Peter Buhler, Thalwil; Thomas Eirich, Au; Frank Hoering; Marcus Oestreicher, both of Zurich, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,530

(22) Filed: Apr. 9, 1999

(30) Foreign Application Priority Data

May 7, 1998 (CH) .................................. 98108331

(51) Int. Cl.$^7$ ..................................... G06F 17/30
(52) U.S. Cl. ......................... 707/206; 707/100; 707/104; 707/200; 711/154; 711/173; 711/166; 370/354; 370/522; 235/380; 235/382
(58) Field of Search .................................. 707/100, 101, 707/104, 200, 206; 711/154, 173, 166; 370/354, 522; 235/380, 382

(56) References Cited

U.S. PATENT DOCUMENTS

| | | | |
|---|---|---|---|
| 4,989,132 | * 1/1991 | Mellender et al. | 717/5 |
| 5,485,613 | 1/1996 | Engelstad et al. | 707/206 |
| 5,535,390 | * 7/1996 | Hilderbrandt | 711/154 |
| 5,577,246 | * 11/1996 | Priddy et al. | 707/202 |
| 5,659,736 | * 8/1997 | Hasegawa et al. | 707/100 |
| 5,799,185 | * 8/1998 | Watanabe | 707/206 |
| 6,098,089 | * 8/2000 | O'Connor et al. | 709/104 |
| 6,199,075 | * 3/2001 | Ungar et al. | 707/206 |

OTHER PUBLICATIONS

Huelsbergen, Lorenz et al., "Very Concurrent Mark-&-Sweep Garbage Collection without Fine-Grain Synchronization", Bell Labs, Lucent Technologies, Murray Hill, NJ; ACM, Oct. 1998, pp. 166–175.*
Lieberman, Henry et al., "A Real-Time Garbage Collector Based on the Lifetimes of Objects", Communications of the ACM, Jun. 1983, vol. 26, No. 6, pp. 419–429.*
Persson, Patrik et al., "An Interactive Environment for Real-Time Software Development", Proceedings of the 33rd International Conference on Technology of Object-Oriented Languages, 2000, TOOLS. Jun. 5–8, 2000, pp. 57–68.*
Siebert, Fridtjof, "Hard real-time garbage collection in the Jamaica Virtual Machine", Sixth International Conference on Real-Time Computing Systems and Applications, 1999 RTCSA, Dec. 13–15, 1999, pp. 96–102.*

* cited by examiner

*Primary Examiner*—Hosain T. Alam
*Assistant Examiner*—Shahid Alam
(74) *Attorney, Agent, or Firm*—Casey P. August

(57) ABSTRACT

Scheme for the distinguishing of reachable objects and non-reachable objects used by an object-based application in a system with volatile memory of limited size. The object-based application operates on n objects whereby Z objects thereof are root objects. The following steps are carried out for each root object: (a) traversing from said root object to any other object that can be reached from said root object; (b) marking all objects that were reached from said root object and storing, while marking, in said volatile memory a description of the path from said root object to the currently visited object; if the marking phase reaches an object and the respective path does not fit into said volatile memory, then this object is not marked but identified as an object which has to be processed later; and continuing the marking phase until all root objects identified as objects which have to be processed later are processed.

27 Claims, 1 Drawing Sheet

FLEXIBLY DELETING OBJECTS IN A RESOURCE CONSTRAINED ENVIRONMENT

TECHNICAL FIELD

The invention concerns a novel approach for the identification and collection of 'garbage' (memory sections that contain information not needed anymore). This approach is well suited for use in systems with memory of limited size, such as integrated circuit cards (e.g. smartcards).

BACKGROUND OF THE INVENTION

Object-based application programs (written in Java, C++, or the like) usually operate on directed graphs. These graphs comprise root objects and regular objects which are interconnected by means of pointers. During the execution of an object-based application program the graph dynamically changes as objects and/or pointers are added, modified or removed.

Object-based execution environments often support the application developer in one of the most tedious and error-prone tasks in programming, namely memory handling. In many systems, objects are only allocated by the application program, but never explicitly de-allocated. In these systems it is the task of a so-called garbage collector (GC) to determine which objects are no longer needed. Furthermore, the GC frees-up the respective memory and returns it to the heap of unused memory. A GC must, every once in a while, clean up wasted memory. In addition, the GC might be used to compact memory by eliminating the gaps created by fragmentation.

Cleaning up the garbage in memory is usually done in two steps, referred to as marking and sweeping. The current SUN Java garbage collector also uses the mark-and-sweep approach according to which every root object in the system is marked initially. Then one follows all the object references inside those objects to other objects not yet marked, and so on, recursively. Finally, when there are no more references to follow, all the unmarked objects are deleted.

Current GC schemes are not well suited for use in resource constrained systems because these GC schemes require more volatile memory which than usually available in these kind of systems.

An integrated circuit card (ICC), more widely known as smartcard, is one example of such a resource constrained system. Other examples are: mobile and/or hand held devices, such as cellular phones, pagers, personal digital assistants, personal area network devices, and so forth.

In the following, we will focus mainly on ICCs and smartcards in particular. The smartcard concept began in Europe prior to 1985, and is today being used in telephone systems, toll roads, game parlors, and personal computers, just to mention some applications.

In the following, the term integrated circuit card will be used, because ISO uses the term to encompass all those devices where an integrated circuit is contained within a card-size piece of plastic, or the like.

Typical ICCs comprise a microprocessor (central processing unit, CPU), a read-only memory (ROM), a volatile random-access memory (RAM), and some type of non-volatile, programmable memory, such as an EEPROM (electrically erasable programmable read only memory). In addition, an ICC usually comprises some kind of a bus (such as a serial bus) and I/O ports for interconnection to a card terminal.

The contents of the ROM type of memory is fixed and can not be changed once manufactured by the semiconductor company. This is a low cost memory, in that it occupies minimum space on the substrate. It is a disadvantage of a ROM that it cannot be changed and that it takes several months to be produced. As opposed to this, an EEPROM is erasable by the user and can be rewritten many times. ROMs and EEPROMs are non volatile. In other words, when the power is removed they still retain their contents.

A RAM is a volatile memory and as soon as the power is removed the data content is lost. A RAM, however, has the advantage that it is much faster than ROMs and EEPROMs. On the other hand, a RAM is more expensive in terms of die size. Usually, the RAM is relatively small. RAM is not used at all for any type of operation involving data that has to be kept permanent and consistent. Unfortunately, always using non-volatile memory has a couple of serious drawbacks. One is the extreme performance penalty that has to be paid as every memory write access is roughly 500 to thousand times slower when using EEPROM instead of RAM. An even more serious problem is the limitation on the amount of guaranteed write cycles (100000 times for EEPROM).

It is an object of the present invention to provide a novel garbage identification and garbage collection scheme, and in particular garbage identification and garbage collection scheme which is well suited for use in resource constrained systems.

It is an object of the present invention to provide a solution for garbage collection in resource constrained systems, such as an integrated circuit cards.

SUMMARY OF THE INVENTION

The present invention concerns a scheme for the distinguishing of reachable objects and non-reachable objects used by an object-based application in a system with volatile memory of limited size. The object-based application operates on n objects whereby Z thereof are root objects. The following steps are carried out for each root object

- traversing from said root object to any other object that can be reached from said root object,
- marking all objects that were reached from said root object and storing, while marking, in said volatile memory a description of the path from said root object to the currently visited object,
- if the marking phase reaches an object and the respective path does not fit into said volatile memory,
  then this object is not marked but identified as an object which has to be processed later,
- continuing the marking phase until all root objects and all objects identified as objects which have to be processed later are processed.

The inventive scheme minimizes the amount of state needed to perform a garbage collection. Furthermore, the inventive allows for a flexible tradeoff between execution time and runtime space requirements. The scheme is well suited for use in systems with constrained resources.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

Figure 1:
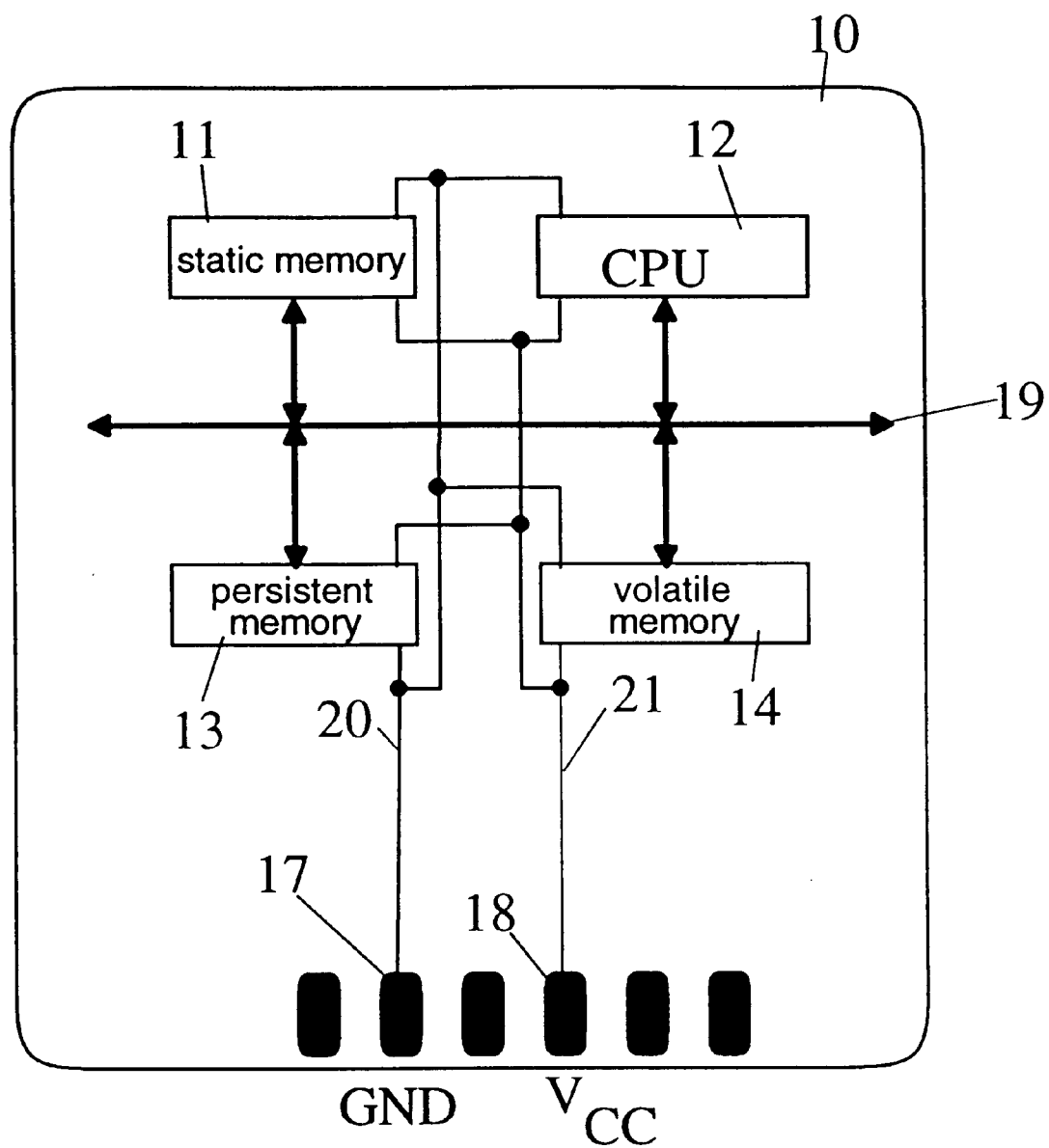
FIG. 1 is a schematic view of an integrated circuit card (ICC), according to the present invention.

The present invention can be used in any kind of system in which an object-based application is executed. The invention is in particular suited for use in resource constrained systems. Typical resource constrained systems are:
- integrated circuit card (ICC) (e.g. smart cards);
- telephones;
- set-top-boxes;
- embedded controllers;
- hand held devices;
- portable computers;
- personal area network (PAN) devices, etc.

In a constrained system the volatile memory is usually limited in size, the compute power is limited, e.g. because a small CPU is employed. Such constrained systems usually also operate at low clock cycle rates.

The basic concept of the present invention is described in connection with an integrated circuit card (ICC) 10, as illustrated in FIG. 1. This card carries a microprocessor 12, a ROM 11, an EEPROM 13, and a RAM 14, like most conventional ICCs. The ICC 10 furthermore comprises an internal bus 19, which allows exchange of information and signaling between the ICC's components. ICC 10 is a contact card. The I/O ports connect to corresponding means of a card terminal. As indicated in FIG. 1, power is supplied via port 17 (ground, GND) and port 18 (positive voltage, Vcc).

This invention concerns an inventive garbage collection (GC) technique for use in systems with constrained resources. The following assumptions are made about the system executing the inventive GC technique:

There are two types of memory V (volatile) and P (non-volatile or persistent). The V memory has following characteristics:
- The available size of this memory is limited either because of the available physical memory or because only a limited amount of memory can be dedicated to the GC task.
- Reading and writing V memory is fast compared to write access to P.

The P memory has the following characteristics:
- this type of memory holds a multiplicity of objects.
- Writing this type of memory is time consuming compared to writing to V memory.
- The objects residing in P can be enumerated.
- Each object consists of a header and a payload area. Header and payload need not be located in consecutive memory cells.
- The payload area is freely usable by program code while the header is dedicated to system tasks. GC requires to store some information in the header of each object. The amount of information contributed by GC to the header should be small since the header is overhead.

Typical examples for V memory is RAM or cache and P could be EEPROM, FlashRAM, or disk storage.

In an object-based environment, the P memory typically contains a multiplicity of objects. Each object can be enumerated and accessed via a pointer (an address which allows to find the object). A pointer in this context is some datum containing an object address and is said to refer to some object. Each object contains a possibly empty set of pointers to objects and a possibly empty set of other information not referring to any objects. Given some object A, it is possible to enumerate all pointers stored in A which refer to (other) objects. The set of objects is located in P memory and their pointers (accordingly) constitute a directed graph (DG).

As the purpose of GC is to identify objects that are no longer referenced, some initial objects (known as root objects) must be known to be essential and thus not be subject to garbage collection. This set of objects is system dependent and does not affect the present garbage identification and collection scheme. This set of objects is referred to as initial rootset (IR).

Per definition, objects reachable within the DG in P memory from objects in IR are not deemed to be garbage. All objects not reachable from any object in IR are deemed to be garbage. Their memory, header and payload, can be reclaimed by the system.

The present garbage identification and collection scheme aims at making a distinction between reachable and not reachable objects. For this purpose, the following states are maintained in V memory:
- the number of unprocessed root objects Z (e.g. by means of a counter)
- the current root object T
- a description of a path TO in DG starting from the current root object T and ending at some object O. The object T is said to be the first object in TO and O is said to be the last.

In P memory each object header might have two bits dedicated to the inventive GC scheme.
- VF bit: this bit indicates whether a object has been visited by the current execution of the GC algorithm. The definition of 0 and 1 (meaning visited or not) can be altered to avoid the resetting of all object's VF bits after a GC run. "VF set" means that the object has been visited independent of the actual VF bit value as stored in memory.
- RF bit (root flag): This flag indicates that the object is a root object and has not yet been processed. "RF set" or "RF=1" means the object is marked as root object and still needs to be processed.

In the following, the steps of an exemplary implementation of the inventive GC scheme is given:
1. Mark all initial root objects in IR with RF=1. Set Z to the number of marked root objects.
2. If Z is zero, then enumerate all objects in P and reclaim the memory of those with VF not set. Terminate the garbage collection.
3. Enumerate objects in P memory and find the first one which has RF set. Let T refer to this object. Set current object C to current root object T.
4. Start to enumerate all pointers in C and do (a)–(e) for each pointer referring to some object O:
   a. If O has VF set continue enumeration within step 4.
   b. Set VF on object O
   c. If V memory is not exhausted, then add object C to the path TO and set C to the current object O. Continue with step 4.
   d. Set RF flag on object O and increment Z and continue with step 4.
5. If path TO is empty continue with step 2. Clear RF and set VF on T. Decrement Z.
6. Remove the last object from TO. Assign this removed object to C and continue with step 4.

The GC algorithm needs to have at least space to store paths of length 2 in V memory. The longer the path can be, the faster is the execution of the present GC.

The state can further be minimized by choosing specific representations of the path TO in V memory. A faster, but space consuming representation would be a sequence of pointers referring to the objects of the path. As the set of possible pointers is usually bigger than the average number of pointers contained in objects, the following optimization can be applied:

Let r be the number of pointers in object O. r' is the minimum number which is bigger or equal to r and which is a power of two. Only $\log 2(r')$ bits are needed to represent a path element from O to one of its referred objects Q. Assume that the pointer to some object Q is the i-th pointer in O then only the least $\log 2(r')$ bits of i are stored in TO.

The computation of the last object in some path TO is done by starting at root T and following the i-th pointers from object to object.

The inventive GC starts from the root objects, like standard mark and sweep GCs.

Usually, the payload section of an object comprises pointers to other objects. In order to identify pointers within the payload of an object, one needs meta data on the layout of the payload. The amount of meta data information can be minimized by clustering pointers within the payload section.

The present invention allows conventional ICCs and other systems, and in particular resource constrained systems, to be modified by simply integrating the essential components either as hardware, as software, or as a combination of hardware and software. The invention enables a variety of applications that identify those objects which are not needed anymore. Once these objects have been successfully identified, one can delete them to free-up the respective memory sections. Instead of deleting these objects, one can add pointers to a queue. The pointers in this queue then point to sections in the memory which can be overwritten. Each time when memory space is required for storing an object, a pointer might be removed from the queue. Then the object is written into the memory section identified by the respective pointer.

One can also compact the memory once all non-reachable objects have been identified. This is of advantage if the memory was fragmented.

What is claimed is:

1. Method for distinguishing reachable objects and non-reachable objects used by an object-based application in a system with volatile memory of limited size, said object-based application operating on n objects whereby Z objects thereof are root objects, said method comprising the steps:

for each root object
traversing from said root object to any other object that can be reached from said root object,
marking all objects that were reached from said root object and storing, while marking, in said volatile memory a description of the path from said root object to the currently visited object,
if the marking phase reaches an object and the respective path does not fit into said volatile memory,
then this object is not marked but identified as an object which has to be processed later,
continuing the marking phase until all root objects and all objects identified as objects which have to be processed later are processed.

2. The method of claim 1, whereby an object which has to be processed later is identified as an additional root object.

3. The method of claim 1, whereby there exists a counter which is employed to count the number of root objects that were processed already.

4. The method of claim 1, whereby said description of the path includes said root object and any other objects which were reached from said root.

5. The method of claim 3, whereby said counter and/or said description of the path is/are maintained in said volatile memory.

6. The method of claim 1, whereby each object has a payload and header.

7. The method of claim 6, whereby said header comprises at least two bits dedicated to the method for distinguishing reachable objects and non-reachable objects.

8. The method of claim 6, whereby said header comprises a bit (VF bit) which indicates whether an object has been visited when traversing from a root object to any other object.

9. The method of claim 6, whereby said header comprises a bit (RF bit) which indicates that an object is a root object.

10. The method of claim 6, whereby said payload comprises pointers to other objects.

11. The method of claim 10, whereby said pointers are arranged within the payload field such that these pointers can be found relying on meta data given in the object's header.

12. The method of claim 1, whereby all root objects are initialized to indicate that they have not yet been processed, this initialization being done prior to the execution of the steps listed in claim 1.

13. The method of claim 1, whereby sections of said volatile memory which contain objects that have not been marked are reclaimed.

14. The method of claim 1, whereby said volatile memory is compacted by rearranging those sections of said volatile memory which contain objects that have been marked.

15. The method of claim 1, whereby said objects are kept in non-volatile memory.

16. Apparatus for distinguishing reachable objects and non-reachable objects used by an object-based application in a system with volatile memory of limited size, said object-based application operating on n objects whereby Z objects thereof are root objects, said apparatus comprising:

means for traversing from each root object to all other objects that can be reached from the root objects, means for marking all objects that were reached from said root, and for storing in said volatile memory a description of the path from said root object to the currently visited object, whereby said means for marking do not mark an object if the respective path does not fit into said volatile memory, means for identifying an object which has not been marked because its path does not fit into said volatile memory, as an object which has to be processed later.

17. The apparatus of claim 16, wherein said means for identifying an object define the respective object to be an additional root object.

18. The apparatus of claim 16, wherein there exists a counter which is employed to count the number of root objects that were processed already by said means for traversing.

19. The apparatus of claim 18, wherein said counter and/or said description of the path is/are stored in said volatile memory.

20. The apparatus of claim 18, wherein said header comprises at least two bits dedicated to the distinguishing of reachable objects and non-reachable objects.

21. The apparatus of claim 16, wherein said description of the path includes said root object and any other objects which were reached from said root.

22. The apparatus of claim 16, wherein each object has a payload and header.

23. The apparatus of claim 16, comprising means for reclaiming sections of said volatile memory which contain objects that have not been marked.

24. The apparatus of claim 16, comprising means for compacting said volatile memory by rearranging those sections of said volatile memory which contain objects that have been marked.

25. The apparatus of claim 16, wherein said objects are kept in non-volatile memory.

26. The apparatus of claim 16 being part of a system with constrained resources.

27. The apparatus of claim 16, being part of an integrated circuit card.

* * * * *